United States Patent [19]
Zeis

[11] Patent Number: 5,931,281
[45] Date of Patent: Aug. 3, 1999

[54] TRANSFER DEVICE

[75] Inventor: Hans Zeis, Parkstein, Germany

[73] Assignee: Maschinen-und Stahlbau Julius Lippert GmbH & Co., Pressath, Germany

[21] Appl. No.: 08/973,081

[22] PCT Filed: May 1, 1996

[86] PCT No.: PCT/DE96/00804

§ 371 Date: Feb. 23, 1998

§ 102(e) Date: Feb. 23, 1998

[87] PCT Pub. No.: WO96/34816

PCT Pub. Date: Nov. 7, 1996

[30] Foreign Application Priority Data

May 4, 1995 [DE] Germany .......................... 195 16 036
Jun. 21, 1995 [DE] Germany .......................... 195 22 417

[51] Int. Cl.⁶ .................................................. B65G 37/00
[52] U.S. Cl. ........................................................ 198/598
[58] Field of Search ........................ 198/370.08, 370.02, 198/598

[56] References Cited

U.S. PATENT DOCUMENTS

| | | |
|---|---|---|
| 1,281,579 | 10/1918 | Johnson .................................. 198/598 |
| 3,083,808 | 4/1963 | Graybeal . |
| 3,212,623 | 10/1965 | Griffith ............................... 198/370.08 |
| 4,295,559 | 10/1981 | Neal et al. .............................. 198/598 |
| 4,441,604 | 4/1984 | Schlig et al. ........................ 198/370.08 |
| 4,643,291 | 2/1987 | Counter et al. .......................... 198/598 |

FOREIGN PATENT DOCUMENTS 3624411  1/1988  Germany .
8400144  1/1984  WIPO .

Primary Examiner—William E. Terrell
Assistant Examiner—Khoi H. Tran
Attorney, Agent, or Firm—Bachman & LaPointe, P.C.

[57] ABSTRACT

Described is an apparatus for transferring an article from a first conveyor to a second conveyor which branches therefrom. The apparatus has a drive shaft from which at least one pivot arm radially projects. A displacement member is rotatably mounted on an end portion of the at least one pivot arm. The displacement member is connected to the drive shaft by an endless loop so that, upon a rotary movement of the drive shaft the associated displacement member performs a circular movement around the drive shaft and in so doing remains in parallel orientation with respect to the direction of advance movement of the first conveyor. The pivot arm involves a lower angular speed during the phase of contact of the displacement member against an article to be transferred than during the phase of displacing the article.

4 Claims, 2 Drawing Sheets

TRANSFER DEVICE

BACKGROUND OF THE INVENTION

The invention concerns an apparatus for transferring an article from a first transport means to a second transport means which branches therefrom.

Apparatuses of that kind are used for example in the large-scale mail order business, in connection with parcel mail or the like.

An apparatus of the kind set forth in the opening part of this specification is known from EP 0 182 938 A1 and EP 0 113 340 B1. In first-mentioned EP 0 182 938 A1 the second transport means is disposed in parallel orientation with the first transport means, so that in that arrangement it is only possible to leave articles on the first transport means or to transfer them from same to the second transport means. That means however that the sorting capacity of that known apparatus is relatively low.

Above-mentioned EP 0 113 340 B1 discloses only a first transport means. That state of the art gives no information as to where the articles are transferred from the first transport means.

DE 32 41 100 A1 describes an apparatus for rejecting piece goods, in particular parcels or packets, or for expelling individual items from a row of piece goods which are transported in succession on a delivery belt. In order to be able to expel the piece goods individually or as a whole from a flow of articles supplied on a delivery belt, arranged in the rejection or expulsion region above the delivery belt is a rejection or deflector member with at least one deflector roller which extends in the direction of travel of the delivery belt on a circular path and by means of which the respective item to be expelled is engaged laterally and/or at the lower edge, and urged out of the direction of travel. In that situation a rubber-covered transport roller engages the item which is moved along in the longitudinal direction at an angle of 90° to the feed flow of piece goods on the delivery belt.

DE 37 34 599 C1 discloses an apparatus for sorting out bottles which are recognised as being defective. That sorting-out apparatus is of such a design configuration that the travel distance by which the bottles are displaced transversely to the direction of travel of the belt in the sorting-out operation is independent of the degree of filling thereof, and is controlled by a drive means. The sorting-out apparatus which is provided to push defective bottles from a main conveyor belt on to a sorting-out belt has a pusher member which is actuated at precisely the correct time by a detection station for detecting defective bottles and which is movable transversely with respect to the main conveying direction, the pusher member having a pusher plate which is fitted with two rows of bristles, and a pushrod which is arranged on the pusher plate, as well as a cam disk which bears against the pushrod and which is drivable as required for one revolution for each bottle to be sorted out, for producing the forward drive movement of the pusher member, together with a return member for the return stroke movement of the pusher member.

SUMMARY OF THE INVENTION

The object of the present invention is to provide an apparatus having at least two displacement members which are mounted rotatably on arms and whose thrust surface with a single axis of rotation is always oriented parallel to the transport direction of a transport means and displaces an article on to a second transport means, wherein even delicate articles can be reliably displaced at a high cycle rate with a low level of noise.

In an apparatus of the kind set forth in the opening part of this specification, that object is attained by an apparatus for transferring an article from a first transport means to a second transport means which branches from the first transport means comprises: a drive shaft; means for rotating the drive shaft, including a drive motor and a transmission for changing the rotary speed of the drive shaft; a pair of opposed pivot arms fixed to the drive shaft for rotation therewith, each pivot arm having an end portion; a displacement member rotatably located on the end portion of each pivot arm; first deflection fixed to each displacement member for rotation therewith; second deflection member fixed to said drive shaft; and an end loop element means engaging the second deflection member with each of the first deflection member wherein rotation of the drive shaft rotates the pivot arms and each displacement member wherein the transmission changes the rotary speed of the drive shaft in dependence on the rotary angle wherein the angular speed during transfer of the article is less than during displacement.

Upon a rotary movement of the associated pivot arm about the drive shaft along the circular path of the axis the at least two displacement members perform a positive movement around the axis in such a way that the displacement member remains in at least approximately parallel orientation with respect to the direction of advance thrust movement of the first transport means. That means that an article to be manipulated is displaced by means of the corresponding displacement member laterally, over a large area corresponding to the surface area dimensions of the respective displacement member, from the first transport means to the associated second transport means along a circular arc and parallel to the direction of advance movement of the first transport means, and is transferred to the second transport means. As the apparatus according to the invention therefore provides that only a rotary movement of the pivot arms about the drive shaft and a rotary movement of the axis associated with the respective pivot arm, that is to say of the displacement member associated with the respective pivot arm, are implemented, the amount of noise produced is negligibly low. The structurally simple configuration of the apparatus results in relatively low manufacturing costs.

In order to be able to use a conventional inexpensive drive motor and to operate the apparatus at high cycle rates, it is desirable for the drive shaft to be connected to the drive motor by way of a transmission means. The transmission means can be used not only for constantly converting the rotary speed of the drive motor into the speed of the drive shaft and thus into the rotary speed of the at least one pivot arm projecting radially away from the drive shaft, with the associated displacement members, but rather the transmission means is provided for a defined change, in dependence on the rotary angle, of the rotary speed of the drive shaft. During the contact phase, that is to say during the portion of the movement of the pivot arm in which the associated displacement member comes into contact with the article to be transferred from the first transport means to the associated second transport means, the drive shaft and therewith the at least one pivot arm are driven, that is to say rotated, comparatively slowly, in order to prevent damaging the article to be manipulated or sorted, even if the article or its packaging is sensitive to shocks. Those articles are for example packages or packets of any kind. After that contact phase in the movement of the arrangement, the pivot arm is then driven rapidly in comparison with the speed during the contact phase in order to achieve the desired cycle times with the apparatus, with a low level of noise production, even when dealing with delicate articles.

A single pivot arm can project radially away from the drive shaft; it is preferable however if a number of pivot arms project radially from the drive shaft in a uniformly distributed array in the peripheral direction. If the apparatus has two pivot arms, then it is possible for the drive shaft to be disposed relatively closely beside the first transport means. If there are more than two pivot arms, it will be appreciated that it is then necessary for the drive shaft to be spaced from the first transport means in such a way that that during a rotary movement of the drive shaft only a respective one of the pivot arms passes with its free end portion over the first transport means towards the second transport means.

Ease of adaptability of the apparatus to possible factors and parameters in respect of the dimensions of the first and/or the second transport means can be achieved if the or each pivot arm is adapted to be adjustable in its length. In that case the at least one endless looping element is to be dimensioned and selected in accordance with the respective pivot arm length.

Damage to the articles to be manipulated, that is to say to be transferred from the first transport means to a second transport means and removed, can be avoided in a further improved manner if the or each displacement member has a limitedly yielding pressure body. The pressure body may comprise a plate of a sponge material, or a plastic foam material, or it may comprise a brush-like member or the like.

The or each first deflection member and the respective second deflection member can be in the form of chain gears and each endless looping element can be in the form of an endless gear chain. Instead of chain gears and endless gear chains, it is also possible for the first and the respective second deflection member to be for example in the form of toothed bevel wheels and for the endless looping element to be in the form of an endless toothed belt.

BRIEF DESCRIPTION OF THE DRAWINGS

An embodiment of the apparatus according to the invention for transferring an article from a first to a second transport means which branches therefrom is described hereinafter and illustrated in the drawing in which.

DETAILED DESCRIPTION

Figure 1:
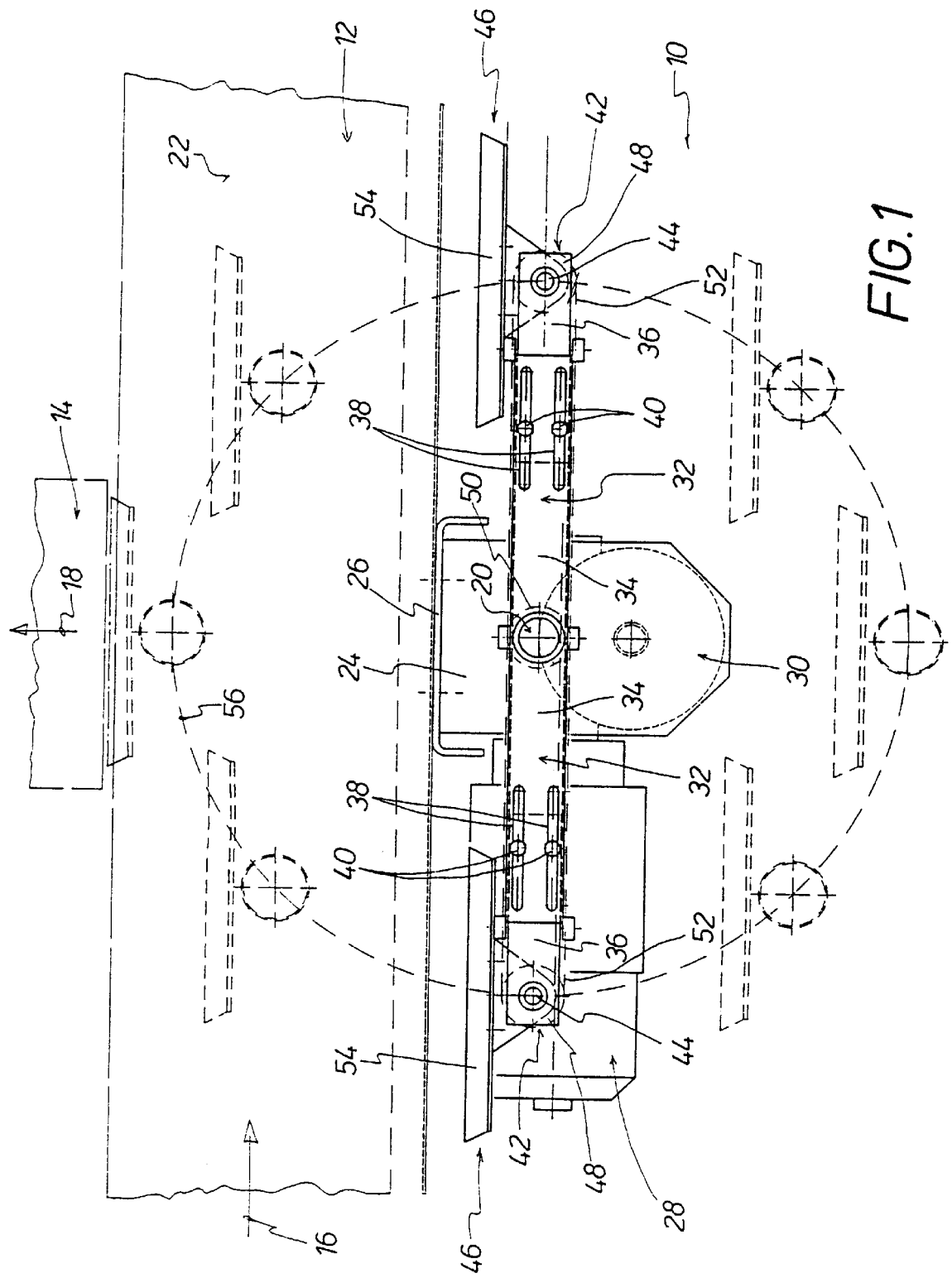
FIG. 1 is a view of the apparatus from above.
Figure 2:
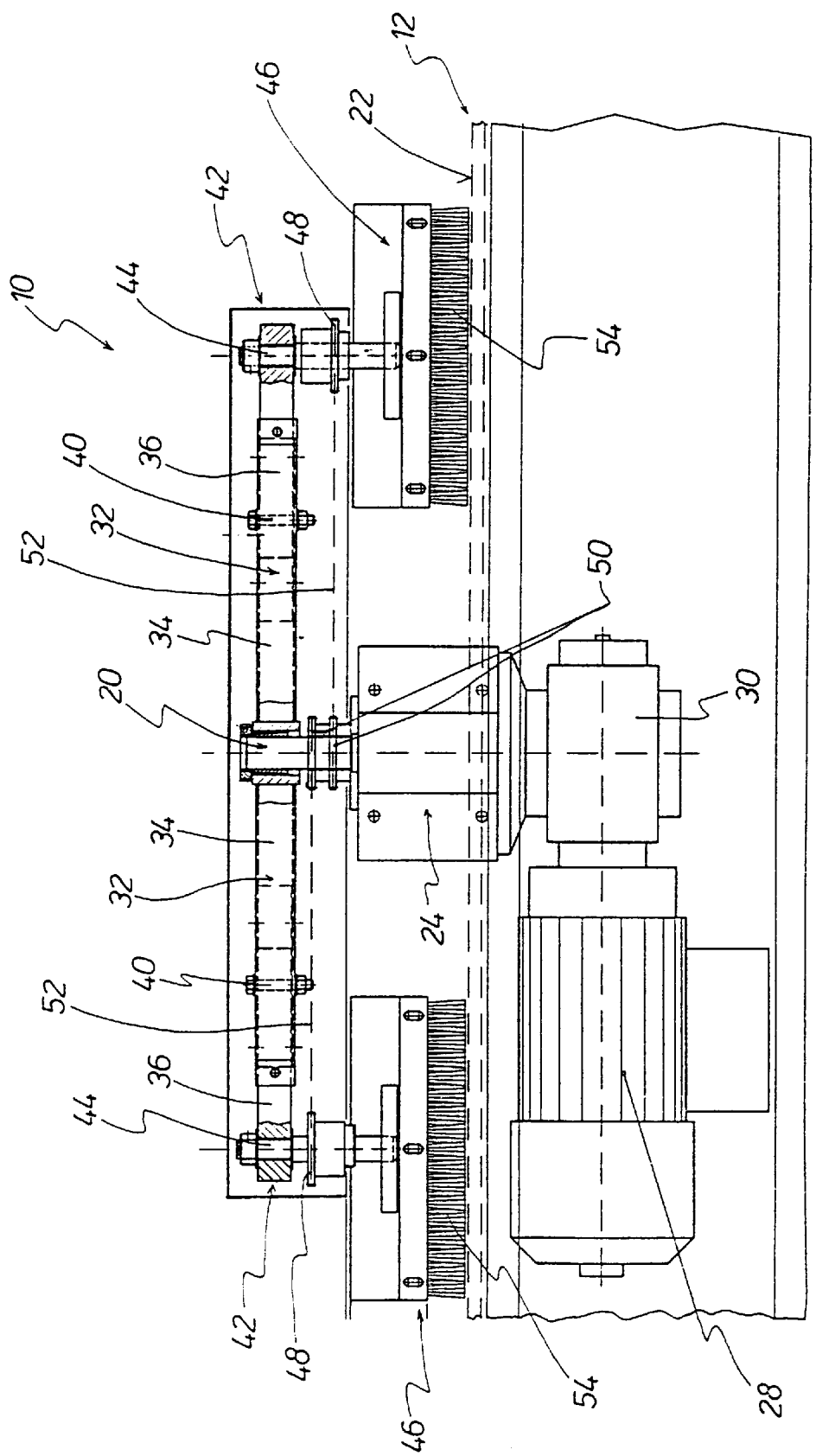
FIG. 2 is a partly cut-away side view of the apparatus shown in FIG. 1.

FIGS. 1 and 2 show an embodiment of an apparatus 10 for transferring an article (not shown) from a first transport means 12 of which a portion is shown to a second transport means 14 which branches from the first transport means 12 and of which only a portion is shown in FIG. 1. The first transport means 12 serves to advance articles in the direction of advance movement indicated by the arrow 16.

The arrow 18 indicates the direction of removal conveying movement of the second transport means 14. A number of second transport means 14 extend away from the first transport means 12 on the same side at spacings from each other. An apparatus 10 is associated with each of those second transport means 14.

The respective apparatus 10 is provided on the side of the first transport means 12, which is in opposite relationship to the associated second transport means 14. The apparatus 10 has a drive shaft 20 which is disposed laterally beside the first transport means 12 and which is oriented perpendicularly relative to the plane 22 of the belt of the first transport means 12. For that purpose the drive shaft 20 is mounted at a mounting arrangement 24 which is suitably fitted to a bracket 26.

The drive shaft 20 is driven, that is to say rotated, by means of a drive motor 28 by way of a control arrangement (not shown). A transmission 30 is provided between the drive motor 28 and the drive shaft 20. The transmission 30 can serve to produce a defined change, in dependence on the rotary angle, of the rotary speed of the drive shaft 30, as has been referred to hereinbefore.

Two pivot arms 32 project away from each other in diametrically opposite relationship from the drive shaft 20. Each of the two pivot arms 32 has a first pivot arm portion 34 which projects away from the drive shaft 20 and which is fixed to the drive shaft and a respectively associated second pivot arm portion 36, wherein the second pivot arm portion 36 is displaceable as desired in the longitudinal direction of the respective pivot arm 32. That is achieved for example by slots 38 in combination with fixing screws 40.

The free end portions 42 of the two pivot arms 32 are afforded by the second pivot arm portions 36. An axis member 44 is rotatably and axially immovably mounted at each of the two free end portions 42. A displacement member 46 and a first deflection member 48 are fixed to each of the two axis members 44. Those first deflection members 48 are for example chain gears of the same diameter, the same tooth pitch and the same tooth configuration. Corresponding to the number of first deflection members 48, two second deflection members 50 are arranged stationarily, that is to say rigidly connected to the stationary bracket 26, in concentric relationship with the drive shaft 20 of the apparatus 10. The two second deflection members 50 are of the same configuration as the two first deflection members 48, that is to say they are for example formed by chain gears of the same diameter and the same tooth configuration and tooth pitch as the first deflection members 48.

An endless looping element 52 is passed in positively locking relationship around each of the two first deflection members 48 and the respectively associated second deflection member 50 in such a way that there is a respective corresponding locking connection between the second and the first deflection members 50, 48. When therefore the drive shaft 20 is driven in rotation by means of the drive motor 28, the displacement members 46 mounted at the free end portions 42 of the two pivot arms 32 at the axis members 44 perform a rotary movement along the circular path 56 (see FIG. 1), wherein the displacement members 46 remain positioned in parallel orientation with respect to the direction of advance movement 16 of the first transport means 12. That is indicated by three positions, which are illustrated in dash-dotted lines, of the two displacement members 46.

As can be seen from FIG. 1 the displacement members 46 which are disposed at the free end portions 42 of the two pivot arms 32 are oriented in mutually parallel relationship in the same direction, facing towards the first transport means 12. Each displacement member 46 is provided with a yielding pressure body 54. The pressure bodies 54 can be formed from a sponge material, a plastic foam material, they can be of a brush-like configuration, or they can be formed in any other manner.

I claim:

1. An apparatus for transferring an article from a first transport means to a second transport means which branches from the first transport means comprises:

a drive shaft;

means for rotating the drive shaft, including a drive motor and a transmission for changing the rotary speed of the drive shaft;

a pair of opposed pivot arms fixed to the drive shaft for rotation therewith, each pivot arm having an end portion;

a displacement member rotatably located on the end portion of each pivot arm;

first deflection fixed to each displacement member for rotation therewith;

second deflection member fixed to said drive shaft; and an endless loop element means engaging said second deflection member with each of the first deflection member wherein rotation of the drive shaft rotates the pivot arms and each displacement member wherein the transmission changes the rotary speed of the drive shaft in dependence on the rotary angle wherein the angular speed during the contact of said displacement member on the article is less than during displacement of the article.

2. Apparatus as set forth in claim 1 characterised in that each pivot arm (32) is adapted to be adjustable in its length.

3. Apparatus as set forth in claim 1, characterized in that each displacement member has a limitedly yielding pressure body.

4. Apparatus as set forth in claim 2, characterized in that each displacement member has a limitedly yielding pressure body.

* * * * *